(12) United States Patent
Kienzle (10) Patent No.: US 9,443,215 B2
(45) Date of Patent: Sep. 13, 2016

(54) NEXT GENERATION SEQUENCING MANAGEMENT

(75) Inventor: Stefan Kienzle, St. Leon-Rot (DE)

(73) Assignee: SAP SE, Walldorf (DE)

( * ) Notice: Subject to any disclaimer, the term of this patent is extended or adjusted under 35 U.S.C. 154(b) by 311 days.

(21) Appl. No.: 13/223,673

(22) Filed: Sep. 1, 2011

(65) Prior Publication Data

US 2013/0060371 A1 Mar. 7, 2013

(51) Int. Cl.
  *G06F 19/00* (2011.01)
  *G06Q 10/06* (2012.01)

(52) U.S. Cl.
  CPC ............... *G06Q 10/06316* (2013.01)

(58) Field of Classification Search
  CPC ........... G06Q 10/06316; G06Q 10/06; G06Q 10/0631; G06Q 10/06311
  USPC ...................... 700/100, 101; 703/1; 705/7.11
  See application file for complete search history.

(56) References Cited

U.S. PATENT DOCUMENTS

| | | | | |
|---|---|---|---|---|
| 4,887,218 A * | 12/1989 | Natarajan | G06Q 10/06 700/102 |
| 5,093,794 A * | 3/1992 | Howie et al. | 700/100 |
| 5,237,508 A * | 8/1993 | Furukawa | G05B 19/41865 700/100 |
| 5,402,350 A | 3/1995 | Kline | |
| 5,410,600 A * | 4/1995 | Toy | 380/268 |
| 5,523,960 A * | 6/1996 | Jeong | 703/6 |
| 5,883,805 A * | 3/1999 | Sada | 700/100 |
| 5,930,138 A * | 7/1999 | Lin et al. | 700/108 |
| 6,108,887 A * | 8/2000 | Ponamgi et al. | 29/407.01 |
| 6,122,621 A * | 9/2000 | Shimada | G06Q 10/06 700/101 |
| 6,198,980 B1 * | 3/2001 | Costanza | G05B 19/41865 700/97 |
| 7,167,767 B2 * | 1/2007 | Clayton et al. | 700/100 |
| 7,200,466 B2 * | 4/2007 | Honda | 700/225 |
| 7,209,869 B1 * | 4/2007 | Kroger et al. | 703/1 |
| 7,660,641 B2 * | 2/2010 | Bournas et al. | 700/95 |
| 8,239,054 B2 * | 8/2012 | Kienzle | 700/107 |
| 8,655,472 B2 * | 2/2014 | Koizumi | H01L 21/67253 700/100 |
| 8,676,367 B2 * | 3/2014 | Yamartino | 700/101 |
| 2005/0043838 A1 * | 2/2005 | Clayton et al. | 700/100 |
| 2006/0020357 A1 * | 1/2006 | Bournas et al. | 700/96 |
| 2007/0112451 A1 * | 5/2007 | Clayton et al. | 700/100 |
| 2009/0198540 A1 | 8/2009 | Kienzle | |
| 2011/0029120 A1 * | 2/2011 | Kienzle | 700/107 |
| 2011/0144786 A1 * | 6/2011 | Pearce | 700/100 |
| 2012/0109351 A1 * | 5/2012 | Yamartino | 700/101 |

* cited by examiner

*Primary Examiner* — Charles Kasenge
(74) *Attorney, Agent, or Firm* — Schwegman Lundberg & Woessner, P.A.

(57) ABSTRACT

Systems and methods to provide sequence management are provided. In example embodiments, a production sequence having a plurality of sequencing objects linked together by relationships is generated. Each sequencing object of the plurality of sequencing objects has a relationship to at least one adjacent sequencing object in the production sequence. A trigger to perform a resequence of the production sequence is received. In response, a new production sequence is determined. The new production sequence may be generated by reusing the sequencing objects and updating at least one of the relationships in the production sequence in order to change the production sequence into the new production sequence. The new production sequence may then be posted. Related capacity planning objects are decoupled from the sequencing objects and the sequencing objects are not affected automatically.

20 Claims, 8 Drawing Sheets

NEXT GENERATION SEQUENCING MANAGEMENT

FIELD

The present disclosure relates generally to data management, and in a specific example embodiment, to next generation sequencing management.

BACKGROUND

Many industries use a repetitive manufacturing process to produce their products. The process may include a production or assembly sequence, which is a scheduling of orders in which a series of orders in the sequence are processed in each assembly station for a certain amount of time. Each order may represent a fixed rate in the sequence, such as one minute. Thus, for example, each minute an item will move from one assembly station to the next in an assembly line.

In case of highly configured products and/or product families, however, some orders require more time than orders at particular assembly stations. For example, a three-cylinder engine may take more time than a six-cylinder engine due to more components. Conventionally, assembly lines may operate on time slots with constant durations. Given this information, conventional sequencers may calculate a sequence order to produce a certain number of products (e.g., three, four, and six cylinder engines) based on capacity (e.g., 1000 engines) for a particular day. For example, assume A=three cylinder engines, B=four cylinder engines, and C=six cylinder engines. The production sequence in order to produce 1000 engines in the day may be A, A, B, A, C, B, and so forth.

There is a desire to optimize capacity and sequence. One conventional method provides calculation of a capacity and a sequence based on the capacity by a single order with a lot size equal to one. When there is a change to the capacity or if one or more orders in the sequence needs to be deallocated or shifted in the sequence (e.g., due to a production disturbance, backlog, quality issues, material shortages), the entire production sequence (or what remains of the sequence to be performed) needs to be resequenced and new sequencing information is generated. For example, if the production sequence has 1000 slots and a backlog occurs which requires the production sequence to be rearranged in order to maintain capacity requirements and continue with production, conventional systems may require a capacity and resequencing process to be performed whereby the resequencing process generates new sequencing information (e.g., for all 1000 orders in the slots). Each resequencing process takes time and consumes processing resources.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods for managing sequencing whereby capacity calculations and sequencing/resequencing calculations are performed independently are provided. Example embodiments allow the resequencing of a production sequence without having to generate new sequencing objects. Instead, sequencing relationships are established between sequencing objects in the production sequence, whereby the resequencing comprises updating the relationships between sequencing objects without having to generate a new sequence with a new set of sequencing objects.

By using embodiments of the present invention, resequencing may be performed independent of capacity calculations and without having to generate a new sequencing objects for the new sequence. Accordingly, one or more of the methodologies discussed herein may obviate a need for performing capacity calculations after an initial capacity calculation and obviates a need to regenerate sequencing information or objects, which may have the technical effect of reducing computing resources used by one or more devices within the system. Examples of such computing resources include, without limitation, processor cycles, network traffic, memory usage, storage space, and power consumption.

Example 1 is method that provides sequence management. The method includes generating a production sequence having a plurality of sequencing objects linked together by relationships. Each sequencing object of the plurality of sequencing objects has a relationship to at least one adjacent sequencing object in the production sequence. The method further includes receiving a trigger to perform a resequence of the production sequence, determining anew production sequence, generating the new production sequence by reusing the sequencing objects and updating at least one of the relationships in the production sequence to change the production sequence to the new production sequence, and posting the new production sequence In Example 2, the subject matter of Example 1 can optionally include maintaining version information for the relationships, the version information allowing maintenance of different versions of production sequences.

In Example 3, the subject matter of Examples 1-2 can optionally include allowing performance of the different versions of the production sequences in parallel.

In Example 4, the subject matter of Examples 1-3 can optionally include wherein the relationship for the sequencing object comprises relationship information stored as an attribute of the sequencing object.

In Example 5, the subject matter of Examples 1-4 can optionally include wherein the relationship for the sequencing object comprises relationship information stored in a database table associated with the sequencing object.

In Example 6, the subject matter of Examples 1-5 can optionally include wherein the relationship for the sequencing object comprises a pointer to the at least one adjacent sequencing object in the production sequence.

In Example 7, the subject matter of Examples 1-6 can optionally include wherein the relationship for the sequencing object comprises a predecessor key to a preceding adjacent sequencing object in the production sequence.

In Example 8, the subject matter of Examples 1-7 can optionally include wherein the relationship for the sequencing object comprises a successor key to a succeeding adjacent sequencing object in the production sequence.

In Example 9, the subject matter of Examples 1-8 can optionally include generating a capacity plan using a module different than a sequencing module used in generating the production sequence.

In Example 10, the subject matter of Examples 1-9 can optionally include generating the plurality of sequencing objects, each sequencing object of the plurality of sequencing objects including sequencing relevant attributes.

In Example 11, the subject matter of Examples 1-10 can optionally include modeling at least one of a gap or extra time into the production sequence or the new production sequence.

Example 12 is system, including at least one processor, which provides sequence management. A sequencing module generates a production sequence having a plurality of sequencing objects linked together by relationships. Each sequencing object of the plurality of sequencing objects has a relationship to at least one adjacent sequencing object in the production sequence. The sequencing module further receives a trigger to perform a resequence of the production sequence and determines a new production sequence. The sequencing module also generates the new production sequence by reusing the sequencing objects and updating at least one of the relationships in the production sequence to change the production sequence to the new production sequence. A posting module posts the new production sequence.

In Example 13, the subject matter of Example 12 can optionally include a capacity module configured to generate a capacity plan, the capacity module being different than the sequencing module configured to generate the production sequence.

Example 14 is a non-transitory machine-readable medium in communication with at least one processor that stores instructions which, when executed by the at least one processor of a machine, cause a machine to perform operations to provide sequence management. The operations include generating a production sequence having a plurality of sequencing objects linked together by relationships. Each sequencing object of the plurality of sequencing objects has a relationship to at least one adjacent sequencing object in the production sequence. The operation further includes receiving a trigger to perform a resequence of the production sequence, determining a new production sequence, generating the new production sequence by reusing the sequencing objects and updating at least one of the relationships in the production sequence to change the production sequence to the new production sequence, and posting the new production sequence.

In Example 15, the subject matter of Example 14 can optionally include wherein the relationship for the sequencing object comprises relationship information stored as an attribute of the sequencing object In Example 16, the subject matter of Examples 14-15 can optionally include wherein the relationship for the sequencing object comprises relationship information stored in a database table associated with the sequencing object.

In Example 17, the subject matter of Examples 14-16 can optionally include wherein the relationship for the sequencing object comprises a pointer to the at least one adjacent sequencing object in the production sequence.

In Example 18, the subject matter of Examples 14-17 can optionally include wherein the relationship for the sequencing object comprises a predecessor key to a preceding adjacent sequencing object in the production sequence.

In Example 19, the subject matter of Examples 14-18 can optionally include wherein the relationship for the sequencing object comprises a successor key to a succeeding adjacent sequencing object in the production sequence.

In Example 20, the subject matter of Examples 14-19 can optionally include wherein the operations further comprise generating a capacity plan using a module different than a sequencing module used in generating the production sequence.

Figure 1A:
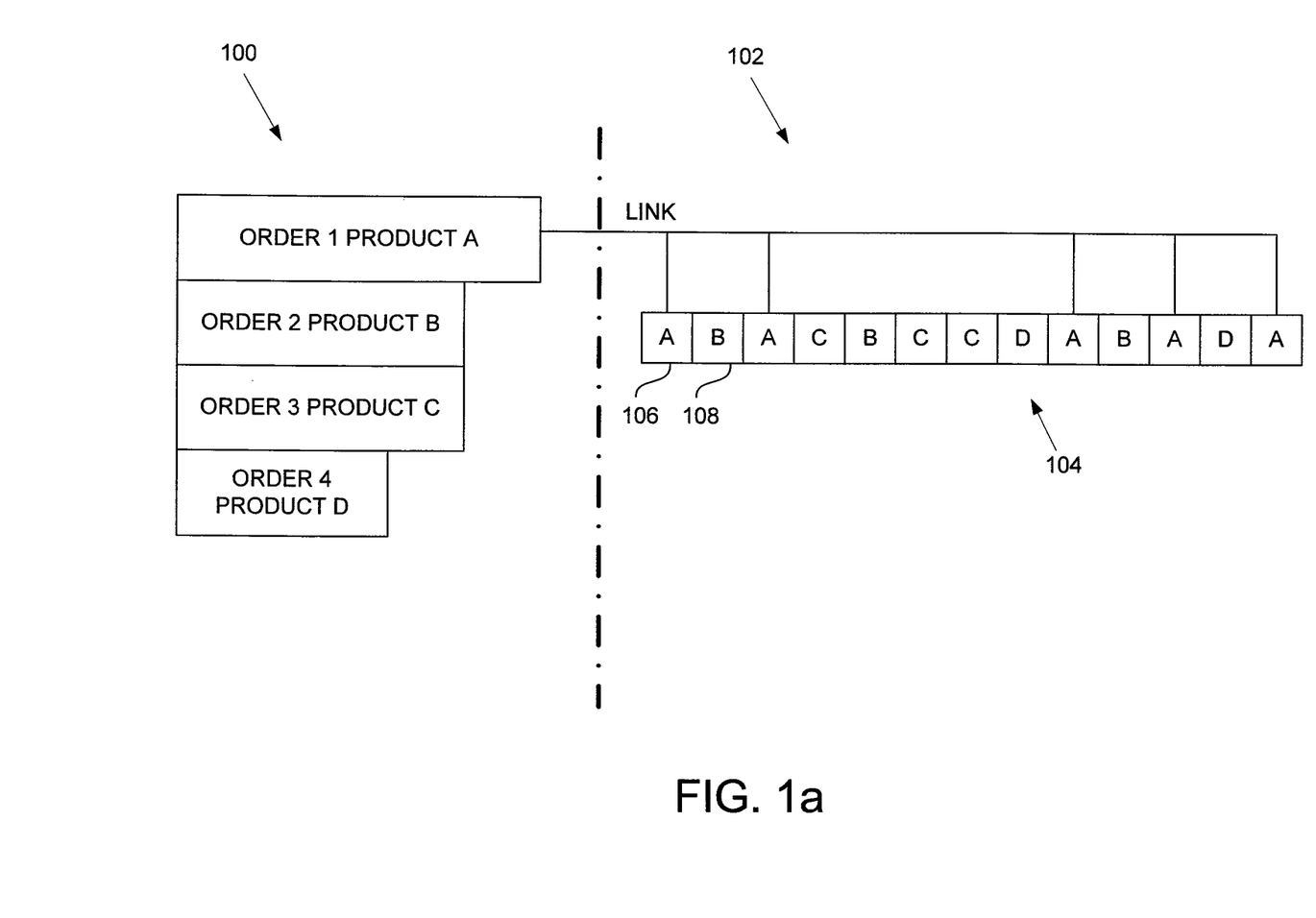
FIG. 1a illustrates a division of capacity and sequencing processes according to example embodiments.

With reference to FIG. 1a, an illustration of a decoupling of a capacity operation 100 from a sequencing operation 102 is shown. The capacity operation 100 comprises scheduling, capacity, and product mix determination. In the simplistic example of FIG. 1a, four orders, each directed to a particular product, are included in the product mix. Each order comprises a lot size indicating a number of the particular product to be produced. For example, order 1 for product A may have a lot size of five pieces, while order 2 for product B and order 3 for product C may have a lot size of three pieces, and order 4 for product D has a lot size of two pieces.

The sequencing operation 102 may generate a production sequence 104 that comprises a plurality of sequencing objects organized in series such that the production sequence 104 is optimized according to constraints and restrictions associated with processing the production sequence 104. For example, a sequence in a repetitive manufacturing environment is an ordered list of production orders related to a production line. Sequencing can be used to carry out task-based scheduling which determines the production sequence 104 in which planned orders are produced on the production line. Sequencing simplifies the dispatching process, especially for high order volumes, and enables a user to display the sequence in a graphic format Each of the sequencing objects represents a piece of an order and may correspond, for example, to a specific task to be performed within a particular timeframe within each assembly station. For example, a first sequencing object A 106 may represent a piece of product A of order 1 while a first sequencing object B 108 in the production sequence 104 represents a piece of the product B of order 2.

Each sequencing object comprises a plurality of sequencing relevant attributes for the sequencing object. The attributes may comprise a sequencing GUID (globally unique identifier) for the sequencing object and a reference order GUID. The reference order GUID may be a key that indicates the parent order or object to which the sequencing object belongs. For example, the reference order GUID of the sequencing object A 106 refers to order 1 for product A. The attributes may further comprise one or more of an external sequence number (e.g., a sequence number for the user or the process like 10, 20, 30, and so on), a planned timestamp (e.g., a time stamp which will be inherited from a slot the order is assigned during sequencing process at a moment in time where the sequence will be frozen. Later on in execution with this information, a deviation between planning and execution can be calculated), a serial number, a rack number, a lift number, and a transport unit. The serial number, a rack number, a lift number, and a transport unit may be optional attributes used to integrate in other processes.

Because the production sequence 104 is not based on a timeline, a backlog (e.g., slower production) does not affect the production sequence 104. However, a change in capacity, material shortages, or quality control issues may cause a resequence to be performed as will be discussed in further detail below.

Figure 1B:
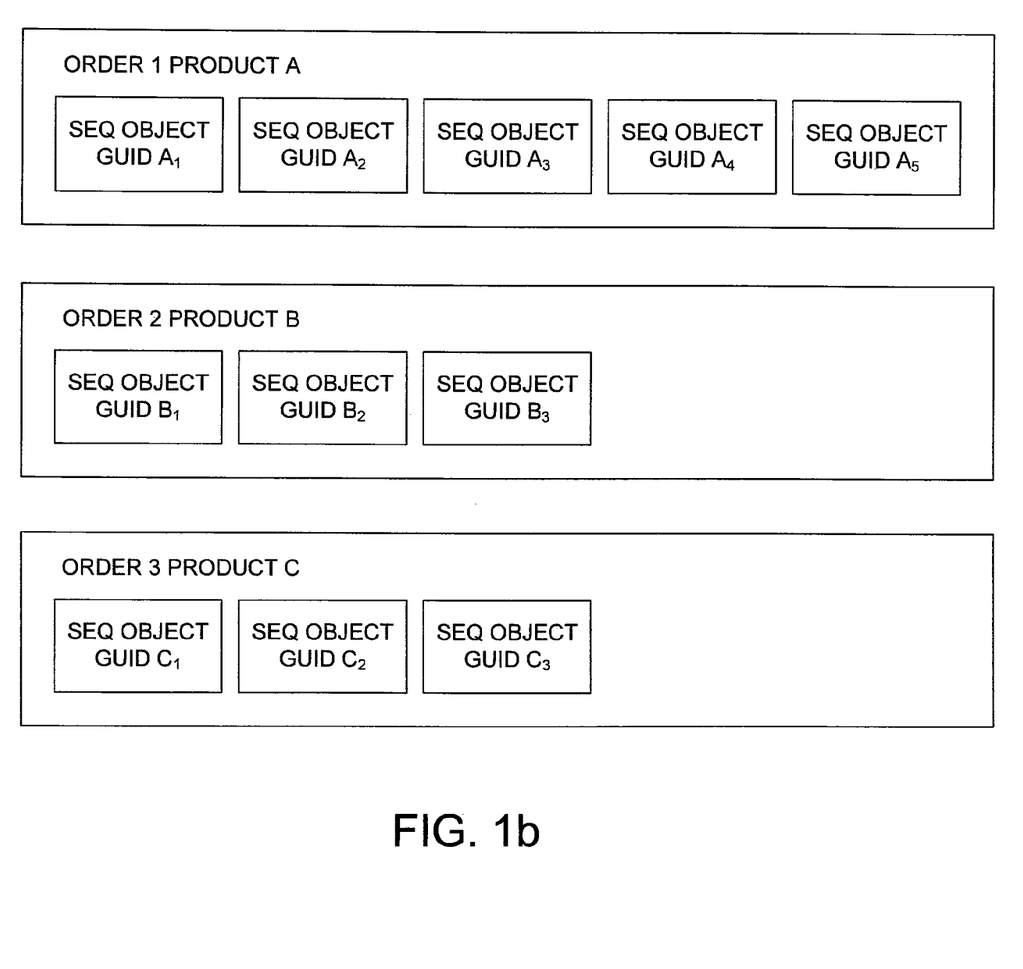
FIG. 1b illustrates sequencing objects for each order in accordance with example embodiments.

FIG. 1b illustrates example sequencing objects for orders 1, 2, and 3 in accordance with example embodiments. Because order 1 for product A has a lot size of five pieces, five sequencing objects are shown for order 1 (e.g., one object for each piece). Similarly, order 2 for product B has three sequencing objects and order 3 for product C has three sequencing objects. Therefore, there is a 1:n relationship between each cumulative order (e.g., order 1 for product A) and its sequencing objects (e.g., $A_1$-$A_5$)

As discussed above, each sequencing object contains the sequencing relevant attributes for that particular piece of the product. In the present example, each sequencing object represents a lot size equal to one (e.g., one piece). However, alternative embodiments may contemplate having a different lot size.

Figure 1C:
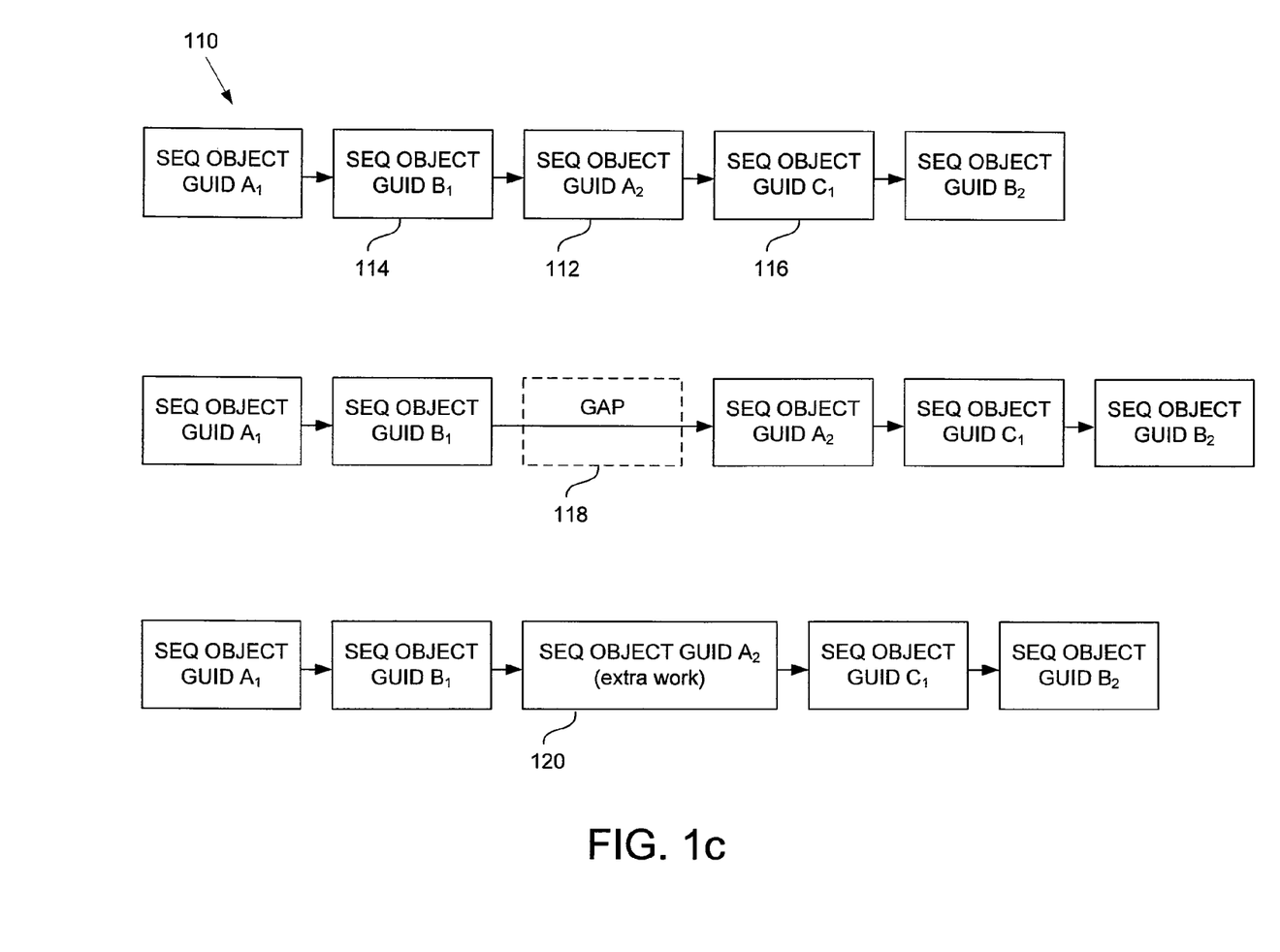
FIG. 1c illustrates different versions of a sequence of sequencing objects in accordance with example embodiments.

Applying the sequencing objects of FIG. 1b to the sequencing operation 102 of FIG. 1a which takes into consideration due dates, restrictions, and optimization algorithms, a portion of a production sequence 110 including sequencing object information is shown in FIG. 1c. The production sequence 110 is shown having sequencing relationships (e.g., represented by arrows) between the sequencing objects. The relationships indicate a sequence in which the sequencing objects are to be performed. For example, a sequencing object $A_2$ 112 should follow a sequencing object $B_1$ 114, but precede sequencing object $C_1$ 116.

In some embodiments, relationship information of the relationships may be stored within each sequencing object. For example, the sequencing object (e.g., sequencing object $A_2$ 112) may include an attribute that indicates a predecessor and a successor sequencing object. For instance, the sequencing object (e.g., sequencing object $A_2$ 112) may include a predecessor key indicating a preceding sequencing object (e.g., sequencing object $B_1$ 114) and a successor key indicating a succeeding sequencing object (e.g., sequencing object $C_1$ 116). Alternatively, other types of pointer may be used to indicate the relationships.

In other embodiments, the relationship information may be stored in a database table. In one embodiment, the table may comprise a plurality of GUIDs of sequencing objects and a corresponding predecessor key and corresponding successor key for each sequencing object. In an alternative embodiment, each sequencing object may have a corresponding table that includes the GUID of the sequencing object and a predecessor key and successor key for the sequencing object. The predecessor keys and successor keys may be GUIDs of the preceding and succeeding sequencing objects, respectively. The described relationship has a new attribute "firmed" (e.g., yes or no). This attribute can be used to firm and unfirm this relationship between the two sequencing objects. Alternatively, other types of pointer may be used to indicate the relationships in the tables.

By using the relationships to link the sequencing objects, the production sequence 110 also enables gaps 118 and extra work 120 in a timeline view of the production sequence 110. In some embodiments, the gap 118 may be used to alleviate work load issues. For example, the production sequence 110 may contain a pilot order (e.g., an order for a tentative model or sample), which will take more time to assemble, along with other orders. In this example, each order may be scheduled for a one minute process in each assembly station. However, the pilot order may require four minutes in each assembly station. Thus, the gap 118 may be provided with a default value (e.g., 1 minute) to accommodate the pilot order. Each gap 118 consumes capacity (e.g., time) and may occupy a task or slot in the production sequence 110 in order to provide more precise scheduling to the corresponding manufacturing process. Alternatively, a sequencing object may be sequenced to include extra work 120, which has a similar effect as the use of the gap 118.

Figure 1D:
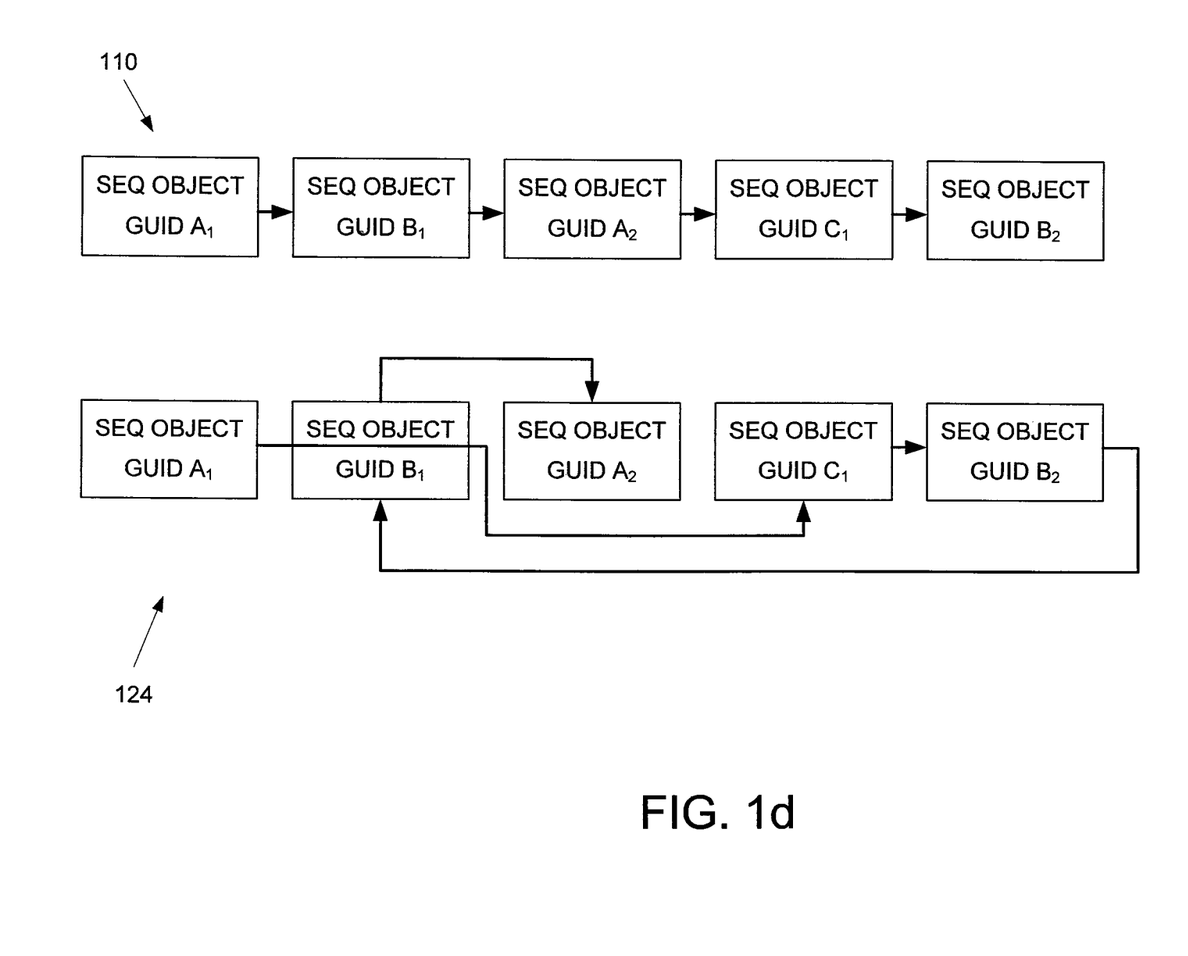
FIG. 1d illustrates a resequence using updated relationship information without having to generate new sequencing objects.

Referring now to FIG. 1d, a portion of the production sequence 110 (e.g., version 1) and a resequenced (new) production sequence 124 (e.g., version 2) is shown. As previously discussed, the production sequence 110 may be optimized based on constraints of an assembly system and on goals of a manufacturer. During execution of the production sequence 110, a problem may occur. For example, the manufacturer may run out of a part. In another example, a certain product may have a production issue, which requires an item or piece to be taken out of the assembly line. In these situations, the capacity has not changed, but the order of the sequencing objects may need to be changed to factor in material shortages or quality control issues. The new production sequence 124 illustrates this resequencing process. As shown, the resequencing will result in a sequencing object order of $A_1$, $C_1$, $B_2$, $B_1$, and $A_2$.

Unlike conventional systems, the creation of the new production sequence 124 does not require generation of new sequencing objects for the new production sequence 124. Instead, the relationship information for each sequencing object of the original production sequence 110 is simply updated. For example, while the predecessor key for sequencing object $A_2$ remains an indication of $B_1$, the successor key for sequencing object $A_2$ is changed from an indication of $C_1$ to none (e.g., there are no further sequencing objects after sequencing object $A_{21}$ in the new production sequence 124). In embodiments where the relationship information is stored in the attributes of the sequencing object, the relationship information (e.g., successor key, predecessor keys) is updated in the sequencing object (e.g., sequencing $A_2$) but no other information is changed in the sequencing object. In embodiments where the relationship information is stored in a table, the table may be updated with the new relationship information.

Use of example embodiments may greatly reduce the processing power needed when new sequences are generated. For example, assume a production sequence has 1000 objects and the first object of the productions sequence needs to be moved to the end of the production sequence. The convention system may require generation of 1000 new objects for the new production sequence since every object is shifted one position. In contrast, example embodiments of the inventive subject matter do not require generation of new objects (e.g., sequencing objects) only a change in the relationship information, if needed, between the objects. In this example, only one relationship may need to be updated (e.g., a new arrow or relationship that links the first sequencing object to the last sequencing object in the production sequence).

In example embodiments, the relationship information may comprise version information. The version information allows for multiple sequences without changing or updating the sequencing objects themselves or their related orders. This enables faster updates and also allows for undo functionality. Additionally, different versions of the sequence may be performed in parallel (e.g., one part of a factory may have a problem that causes a resequence, but the rest of the factory can still perform the original sequence).

Figure 2:
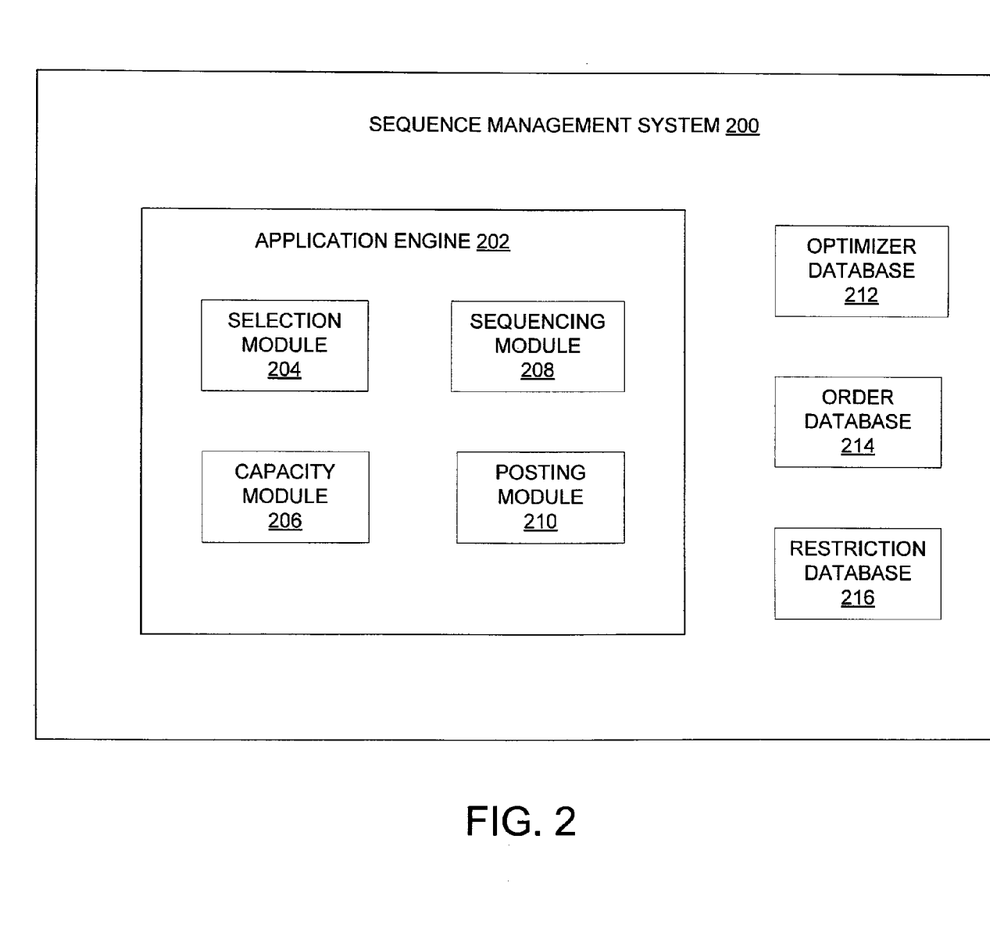
FIG. 2 is a block diagram illustrating a sequence management system.

Referring to FIG. 2, a sequence management system 200 in which example embodiments may be performed is shown. The sequence management system 200 generates optimized sequences and handles resequencing by changing relationships between sequencing objects. The sequence management system 200 comprises an application engine 202 which includes a plurality of modules communicatively coupled together for optimizing sequences handling the sequencing process. In example embodiments, the application engine 202 comprises a selection module 204, a capacity module 206, a sequencing module 208, and a posting module 210. The sequence management system 200 further comprises (or is coupled to) a plurality of databases that provide data for generating sequences and store data including relationship information resulting from the sequencing process. The databases include an optimizer database 212, an order database 214, and a restriction database 216. Components not necessary for operations of example embodiments of the inventive subject matter have not been included.

The selection module 204 selects orders from a database for capacity processing and sequencing processing. For example, a plurality of orders may be stored in the order database 214. A selection of one or more orders (e.g., order 1 for product A, order 2 for product B) may be selected for production, and thus selected for capacity and sequencing processing.

The capacity module 206 performs the capacity planning. Capacity planning relates to overall planning for an assembly facility (e.g., produce 100 vehicles or engines in a particular day). In example embodiments, capacity planning may be performed once by volume for a planning "time bucket." For example, the "time bucket" may refer to a day. Within a day, a production system may be able to handle a certain number of orders or a particular number of timeslots. The capacity module 206 calculates a capacity plan based on the selected orders, production capabilities, and goals. For example, the sequence may correspond to a vehicle or engine assembly process. Goals may include, for example, customer due dates, avoidance of production bottlenecks, and capacity utilization base for synchronization with a supply chain (e.g., just in sequence supply delivery).

The sequencing module 208 generates a production sequence of orders or sequencing objects. The sequencing may be performed within the same planning "time bucket" from the capacity plan. The production sequence is a sequence that is provided, for example, to a facility for manufacturing guidance as well as being provided to suppliers in order to schedule just in time or just in sequence supply delivery. The sequencing module 208 may access the order database 214 to obtain information for each order (e.g., of the selected orders to be organized into a sequence). In some embodiments, the sequencing objects are scheduled according to a fixed pattern (e.g., one minute per task of a sequencing object).

The sequencing module 208 optimizes the sequence by accessing appropriate restrictions and constraints from the restriction database 216. A model constraint for the car assembly sequence, for example, may be that there be an even distribution of complex car models in the sequence. For instance, the sequence may have a vehicle with a lot of options, followed by a basic vehicle, followed by a vehicle with few options, which is followed by another vehicle with a lot of options. By spacing the orders with lots of options a particular distance apart, the sequence may flow smoothly and avoid peaks (e.g., assembly time peaks). In another model-to-model example, when producing a series of white vehicle, a constraint may be that every fifth car should be non-white. This constraint allows individuals checking vehicle color quality to have an opportunity to readjust their eyes. While example embodiments are discussed with reference to an engine and vehicle assembly processes, embodiments of the present invention may be utilized in any type of process or system that operates based on orders in a sequence. In some embodiments, the sequencing module 208 optimizes the sequence by also accessing optimizing algorithms stored in the optimizer database 212.

The result of the sequencing module 208 is a production sequence that is posted by the posting module 210 to the order database 214. The order database 214 may be accessed by an assembly facility (e.g., factory) for manufacturing guidance. Alternatively, data from the order database 214 may be provided to suppliers in order to schedule just in time or just in sequence supply delivery. It should be noted that, in some embodiments, the sequencing module 208 or other modules of the application engine 202 may be located separate from the other components of the application engine 202 (e.g., in a different system or device).

While capacity planning may be performed seldom during a particular time frame by the capacity module 206 (e.g., once a day), sequencing may be performed by the sequencing module 208 more frequently (e.g., loops with ending conditions). Because the capacity processing and sequence processing are not directly coupled together, a change in a sequence order does not require a new capacity calculation. Similarly, a change in capacity does not trigger an automatic resequencing. However, a shortage of material, quality control issue, or any other reason that requires a change in a sequence may trigger the sequencing module 208 to resequence (e.g., create a new version of a sequence) for posting. Unlike conventional systems, the sequencing module 208 does not need to generate new sequencing objects or information for each order. Instead, relationship information indicating the new sequence is updated (using keys or a database table) between existing sequencing objects.

Figure 3:
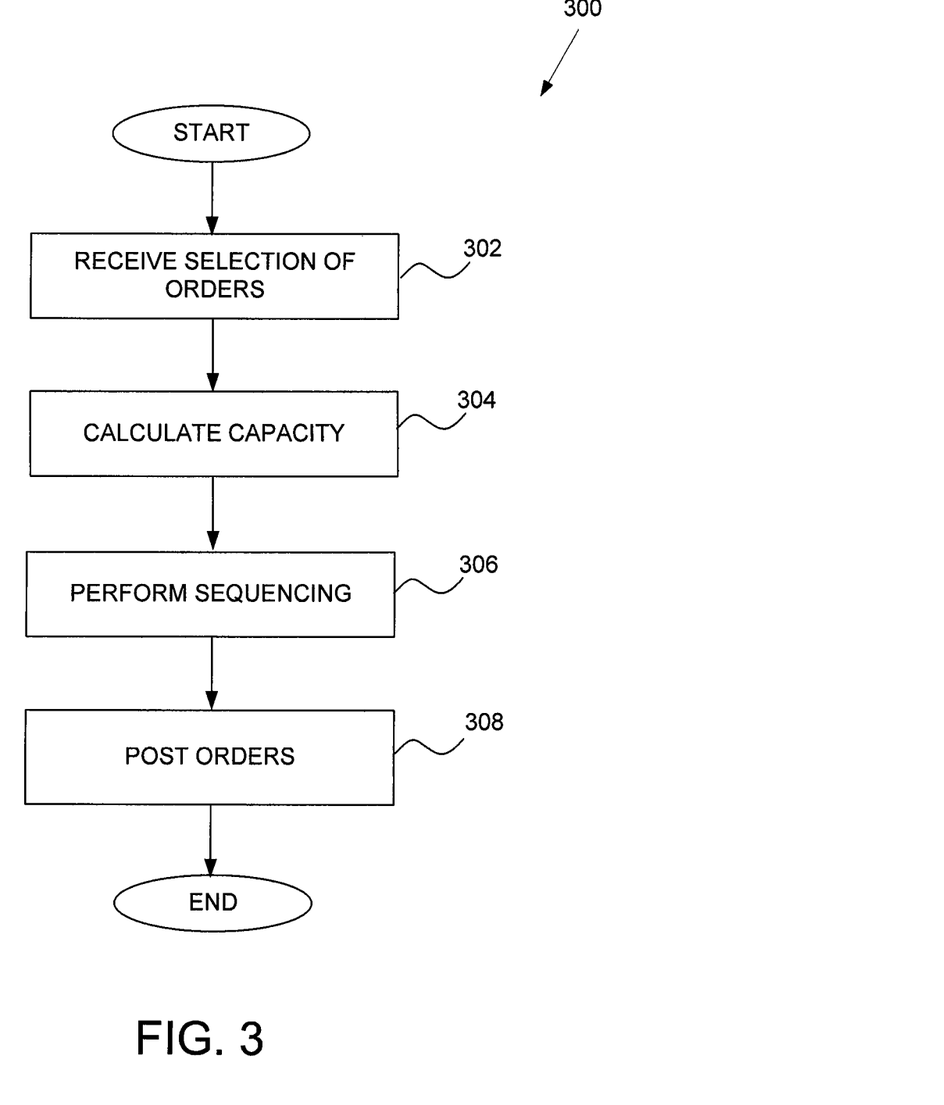
FIG. 3 is a flowchart of an example method to provide capacity separated sequencing.

FIG. 3 is a flowchart of an example method 300 to provide capacity separated sequencing management. In operation 302, a selection of orders is received by the selection module 204. In example embodiments, the orders may be selected from a database of orders.

In operation 304, capacity is calculated by the capacity module 206. The capacity module 206 calculates a capacity plan comprising capacity planning objects based on the selected orders from operation 302, production capabilities, and goals. For example, the capacity plan may indicate that 100 orders may be produced in a day and specify the orders that are desired to be produced.

The capacity plan is then provided to the sequencing module 208, which performs sequencing in operation 306 using the capacity plan and the selected orders. The sequencing module 208 generates an optimized sequence by accessing appropriate restrictions and constraints from the restriction database 216 to order the sequencing objects in a manner whereby sequencing objects of orders with, for example, lots of options are spaced a particular distance apart in order for the sequence to flow smoothly and avoid assembly time peaks. In some embodiments, the sequencing module 208 optimizes the production sequence by accessing optimizing algorithms stored in the optimizer database 212. It is noted that the related capacity planning objects are decoupled from the sequencing objects and the sequencing objects are not affected automatically.

The result of the sequencing module 208 is a sequence that is posted by the posting module 210 in operation 308. In some embodiments, the sequence is posted to the order database 214, which may be accessed by an assembly facility for manufacturing guidance.

Figure 4:
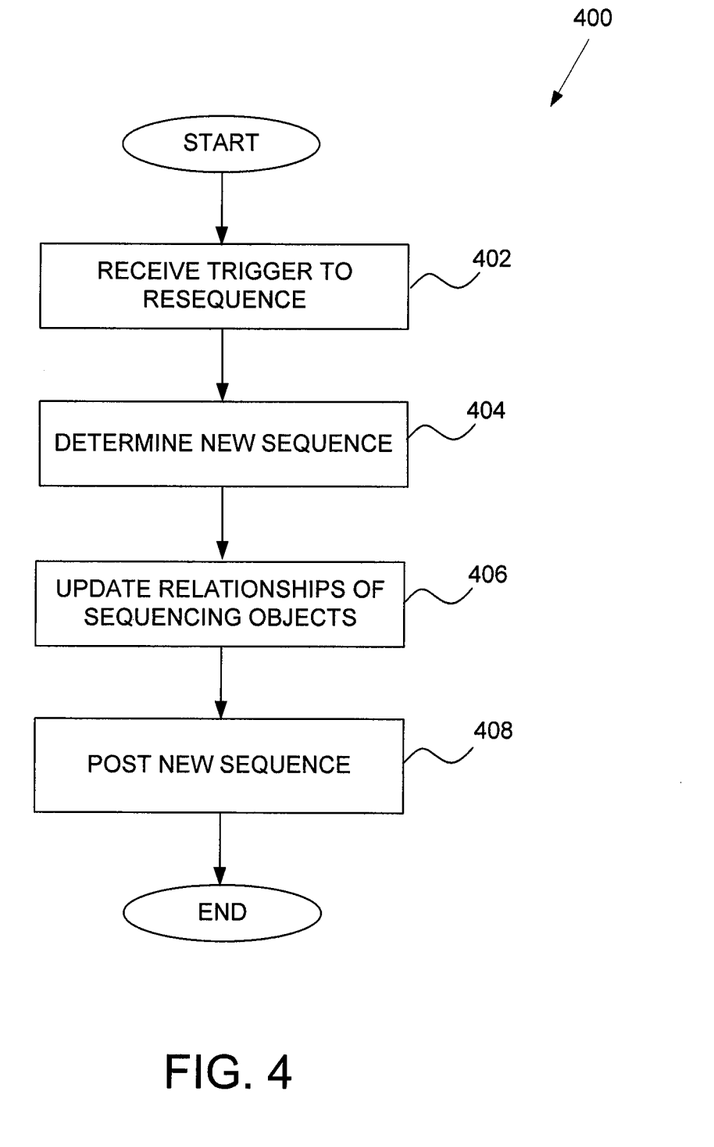
FIG. 4 is a flowchart of an example method to resequence using updated relationship information.

FIG. 4 is a flowchart of an example method 400 to resequence without having to generate new sequencing objects. Unlike convention sequencing systems, the method 400 does not generate new sequencing objects for each order upon a resequencing process. Instead, relationship information indicating the new sequence is updated (e.g., using keys or a database table), while the previously generated sequencing objects may remain unchanged.

In operation 402, a resequencing trigger is received. In some embodiments, a change in capacity may trigger the resequencing operation 402. In other embodiments, a change to a version of a sequence may be needed based on material shortages, quality control issues (e.g., requires an order to be pulled from the assembly line), or other issues which require change in an order of one or more sequencing objects of the production sequence.

A new production sequence may be determined by the sequencing module 208 in operation 404. The sequencing module 208 may utilize the existing capacity plan (or a new capacity plan if the trigger is in response to a change in capacity), restrictions, and optimizing algorithms to determine the new production sequence.

Once the new production sequence is determined, the current version of the production sequence is updated in operation 406 to reflect the new production sequence by the sequencing module 208. The updating of the current production sequence comprises updating relationships between sequencing objects of the current production sequence to indicate new relationships based on the new production sequence. The relationships are updated by changing relationship information associated with one or more affected sequencing objects. In some embodiments, a predecessor key and/or successor key for each sequencing object is updated to indicate a new predecessor key and/or successor key. In other embodiments, a database table is updated with the new predecessor keys and/or successor keys for the new production sequence.

The updating also may comprise storing of a new version of the production sequence in addition to maintaining previous versions of the production sequence. By maintaining different versions of the production sequence, roll backs, for example, may be easily implemented. The new production sequence is posted in operation 408 by the posting module 210.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 5:
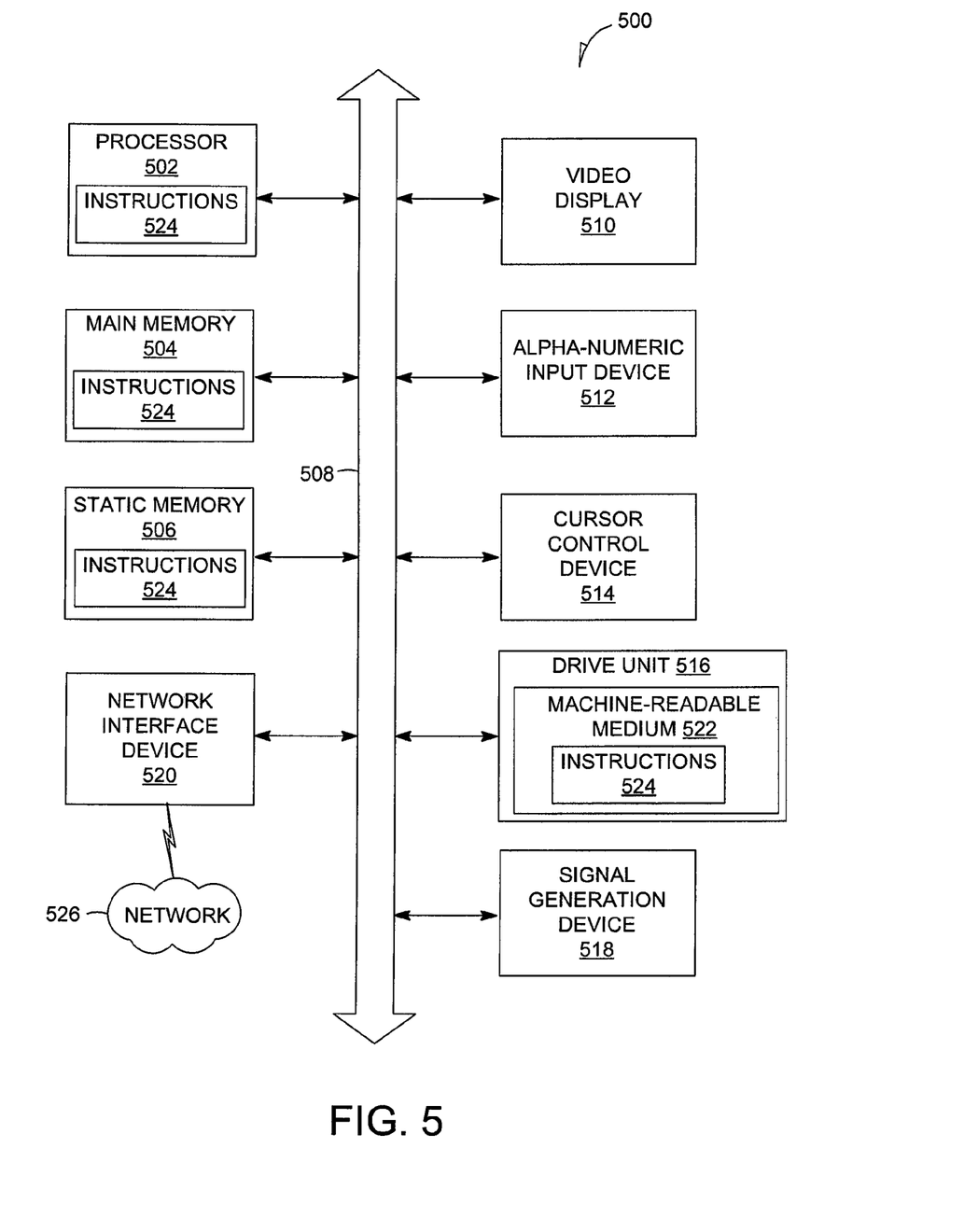
FIG. 5 is a simplified block diagram of a machine in an example form of a computing system within which a set of instructions for causing the machine to perform any one or more of the methodologies discussed herein may be executed.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). In example embodiments, the computer system 500 also includes one or more of an alpha-numeric input device 512 (e.g., a keyboard), a user interface (UI) navigation device or cursor control device 514 (e.g., a mouse), a disk drive unit 516, a signal generation device 518 (e.g., a speaker), and a network interface device 520.

The disk drive unit 516 includes a machine-readable storage medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable storage medium 522 is shown in an exemplary embodiment to be a single medium, the term "machine-readable storage medium" may include a single storage medium or multiple media (e.g., a centralized or distributed database, or associated caches and servers) that store the one or more instructions 524. The term "machine-readable storage medium" shall also be taken to include any tangible medium that is capable of storing, encoding, or carrying instructions for execution by the machine and that causes the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 524 may further be transmitted or received over a communications network 526 using a transmission medium via the network interface device 520 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As used herein, the term "or" may be construed in either an inclusive or exclusive sense. Additionally, although various example embodiments discussed focus on a specific network-based environment, the embodiments are given merely for clarity in disclosure. Thus, any type of electronic system, including various system architectures, may employ various embodiments of the search system described herein and is considered as being within a scope of example embodiments.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
generating a production sequence having a plurality of sequencing objects linked together by relationship information stored in the sequencing objects, each sequencing object of the plurality of sequencing objects storing corresponding relationship information indicating at least one adjacent sequencing object in the production sequence;

receiving a trigger to perform a resequence of the production sequence;

determining, using at least one processor, a new production sequence in response to receiving the trigger;

generating the new production sequence by reordering the sequencing objects in the production sequence to reflect the new production sequence, the reordering comprising updating the relationship information stored in a sequencing object that is moved in the new production sequence to indicate a different adjacent sequencing object, the relationship information that is updated comprising a predecessor key stored in the sequencing object, the predecessor key indicating a preceding adjacent sequencing object in the production sequence; and posting the new production sequence.

2. The method of claim 1, further comprising maintaining version information for the relationship information, the version information allowing maintenance of different versions of production sequences.

3. The method of claim 2, further comprising allowing performance of the different versions of the production sequences in parallel.

4. The method of claim 1, wherein the relationship information that is updated comprises relationship information stored as an attribute of the sequencing object.

5. The method of claim 1, further comprising updating relationship information stored in a database table associated with the sequencing object.

6. The method of claim 1, wherein the relationship information that is updated further comprises a successor key stored in the sequencing object, the successor key indicating a succeeding adjacent sequencing object in the production sequence.

7. The method of claim 1, further comprising generating a capacity plan using a module different than a sequencing module used in generating the production sequence.

8. The method of claim 1, further comprising generating the plurality of sequencing objects, each sequencing object of the plurality of sequencing objects storing sequencing relevant attributes including the relationship information.

9. The method of claim 1, further comprising modeling at least one of a gap or extra time into the production sequence or the new production sequence.

10. The method of claim 1, wherein the relationship information that is updated further comprises a pointer to the at least one adjacent sequencing object in the production sequence.

11. A system comprising:
at least one processor;
a sequencing module configured to:
generate a production sequence having a plurality of sequencing objects linked together by relationship information stored in the sequencing objects, each sequencing object of the plurality of sequencing objects storing corresponding relationship information indicating at least one adjacent sequencing object in the production sequence,
receive a trigger to perform a resequence of the production sequence,
determine, using the at least one processor, a new production sequence in response to receiving the trigger, and
generate the new production sequence by reordering the sequencing objects in the production sequence to reflect the new production sequence, the reordering comprising updating the relationship information stored in a sequencing object that is moved in the new production sequence to indicate a different adjacent sequencing object, the relationship information that is updated comprising a predecessor key to a preceding adjacent sequencing object in the production sequence; and
a posting module configured to post the new production sequence.

12. The system of claim 11, further comprising a capacity module configured to generate a capacity plan, the capacity module being different than the sequencing module configured to generate the production sequence.

13. A machine-readable medium having no transitory signals and storing instructions which, when executed by the at least one processor of a machine, cause the machine to perform operations comprising:
generating a production sequence having a plurality of sequencing objects linked together by relationship information stored in the sequencing objects, each sequencing object of the plurality of sequencing objects storing corresponding relationship information indicating at least one adjacent sequencing object in the production sequence;
receiving a trigger to perform a resequence of the production sequence;
determining a new production sequence in response to receiving the trigger;
generating the new production sequence by reordering the sequencing objects in the production sequence to reflect the new production sequence, the reordering comprising updating the relationship information stored in a sequencing object that is moved in the new production sequence to indicate a different adjacent sequencing object, the relationship information that is updated comprising a successor key to a succeeding adjacent sequencing object in the production sequence; and
posting the new production sequence.

14. The machine-readable medium of claim 13, wherein the relationship information for the sequencing object comprises relationship information stored as an attribute of the sequencing object.

15. The machine-readable medium of claim 13, wherein the relationship information for the sequencing object further comprises relationship information stored in a database table associated with the sequencing object.

16. The machine-readable medium of claim 13, wherein the relationship information for the sequencing object further comprises a predecessor key to a preceding adjacent sequencing object in the production sequence.

17. The machine-readable medium of claim 13, wherein the operations further comprise generating a capacity plan using a module different than a sequencing module used in generating the production sequence.

18. A method comprising:
generating a production sequence having a plurality of sequencing objects linked together by relationship information stored in the sequencing objects, each sequencing object of the plurality of sequencing objects storing corresponding relationship information indicating at least one adjacent sequencing object in the production sequence;
receiving a trigger to perform a resequence of the production sequence;
determining, using at least one processor, a new production sequence in response to receiving the trigger;
generating the new production sequence by reordering the sequencing objects in the production sequence to reflect the new production sequence, the reordering comprising updating the relationship information stored in a sequencing object that is moved in the new production sequence to indicate a different adjacent sequencing object, the relationship information that is updated comprising a successor key stored in the sequencing object, the successor key indicating a succeeding adjacent sequencing object in the production sequence; and posting the new production sequence.

19. A system comprising:

at least one processor;

a sequencing module configured to:

generate a production sequence having a plurality of sequencing objects linked together by relationship information stored in the sequencing objects, each sequencing object of the plurality of sequencing objects storing corresponding relationship information indicating at least one adjacent sequencing object in the production sequence, receive a trigger to perform a resequence of the production sequence, determine, using the at least one processor, a new production sequence in response to receiving the trigger, and generate the new production sequence by reordering the sequencing objects in the production sequence to reflect the new production sequence, the reordering comprising updating the relationship information stored in a sequencing object that is moved in the new production sequence to indicate a different adjacent sequencing object, the relationship information that is updated comprising a successor key to a succeeding adjacent sequencing object in the production sequence; and a posting module configured to post the new production sequence.

20. A machine-readable medium having no transitory signals and storing instructions which, when executed by the at least one processor of a machine, cause the machine to perform operations comprising:

generating a production sequence having a plurality of sequencing objects linked together by relationship information stored in the sequencing objects, each sequencing object of the plurality of sequencing objects storing corresponding relationship information indicating at least one adjacent sequencing object in the production sequence;

receiving a trigger to perform a resequence of the production sequence;

determining a new production sequence in response to receiving the trigger;

generating the new production sequence by reordering the sequencing objects in the production sequence to reflect the new production sequence, the reordering comprising updating the relationship information stored in a sequencing object that is moved in the new production sequence to indicate a different adjacent sequencing object, the relationship information that is updated comprising a predecessor key to a preceding adjacent sequencing object in the production sequence; and posting the new production sequence.

* * * * *